(12) United States Patent
Tran

(10) Patent No.: US 12,440,786 B2
(45) Date of Patent: Oct. 14, 2025

(54) WATER FILTER

(71) Applicant: Son Van Tran, Ha Noi (VN)

(72) Inventor: Son Van Tran, Ha Noi (VN)

(73) Assignee: KAROFI R&D COMPANY LIMITED, Ha Noi (VN)

( * ) Notice: Subject to any disclaimer, the term of this patent is extended or adjusted under 35 U.S.C. 154(b) by 377 days.

(21) Appl. No.: 17/970,630

(22) Filed: Oct. 21, 2022

(65) Prior Publication Data

US 2023/0052030 A1 Feb. 16, 2023

(51) Int. Cl.
*B01D 35/30* (2006.01)
*B01D 29/33* (2006.01)
(Continued)

(52) U.S. Cl.
CPC ........... *B01D 35/30* (2013.01); *B01D 29/333* (2013.01); *B01D 39/06* (2013.01); *B01D 39/16* (2013.01);
(Continued)

(58) Field of Classification Search
CPC ...... B01D 35/30; B01D 29/333; B01D 39/06; B01D 39/16; B01D 2201/184;
(Continued)

(56) References Cited

U.S. PATENT DOCUMENTS

2022/0219102 A1* 7/2022 Myung ................. B01D 29/114

\* cited by examiner

*Primary Examiner* — Madeline Gonzalez

(57) ABSTRACT

The present invention relates to a water filter comprising: a water filter cartridge including a water filter cartridge body, a water filter cartridge outlet cap having a water filter cartridge outlet, and a water filter cartridge sealing cap. The water filter cartridge body in a hollow cylinder form with a central hollow space, one end of the water filter cartridge body is coupled with the water filter cartridge outlet cap so that communicating with the water filter cartridge outlet, and the another end of the water filter cartridge body is coupled with the water filter cartridge sealing cap. The water filter cartridge outlet in a hollow cylinder form protruding from one surface of the water filter cartridge outlet cap. The filter container for containing the water filter cartridge therein, wherein the filter container including a filter container body, a filter container cap, a filter container inlet, and a filter container outlet, wherein the filter container inlet and the filter container outlet arranged at a filter container body bottom. The filter container body having a filter container outlet cylinder hole provided at the filter container body bottom for receiving the water filter cartridge outlet, so that when water flows into the filter container through the filter container inlet will surround the water filter cartridge and flows through the water filter cartridge body into the central hollow space of the water filter cartridge body, and flows to the filter container outlet through the water filter cartridge outlet. The filter container body having ribs provided at an inner surface of the filter container body bottom to reinforce for the filter container body bottom and providing gaps placed between the inner surface of the filter container body bottom and the outer surface of the water filter cartridge outlet cap, so that replacements or miscellaneous uses of the water filter cartridges become impossible.

12 Claims, 17 Drawing Sheets

(51) Int. Cl.
*B01D 39/06* (2006.01)
*B01D 39/16* (2006.01)

(52) U.S. Cl.
CPC .. *B01D 2201/184* (2013.01); *B01D 2201/291* (2013.01); *B01D 2201/303* (2013.01); *B01D 2201/313* (2013.01); *B01D 2201/347* (2013.01)

(58) Field of Classification Search
CPC ........ B01D 2201/291; B01D 2201/303; B01D 2201/313; B01D 2201/347; B01D 29/114; B01D 29/90; B01D 29/92; B01D 39/2062; B01D 2239/069; B01D 29/232; B01D 29/353; B01D 39/083; B01D 29/58
USPC ....... 210/232, 282, 455, 314, 315, 337, 338, 210/342, 440, 443
See application file for complete search history.

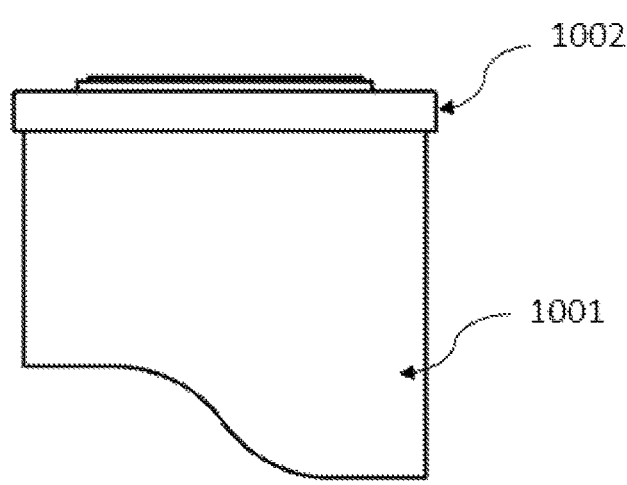
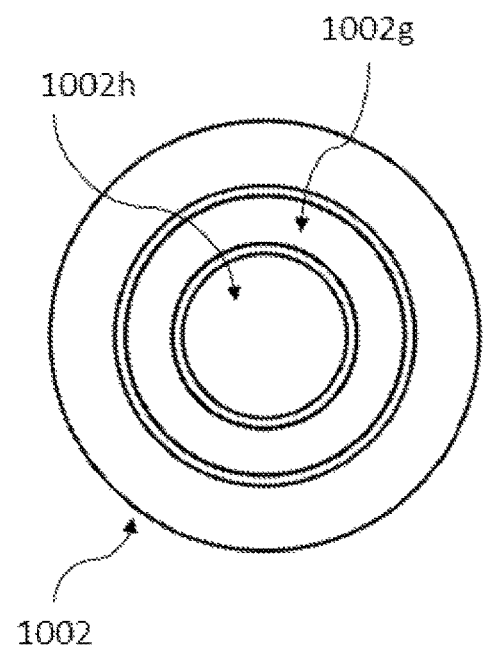
FIG.10B
PRIOR ART
FIG.10C
PRIOR ART

WATER FILTER

TECHNICAL FIELD

The present invention relates to a water filter, in particularly a water filter with an improving structure in a manner which provides a dedicated water filter or a special water filter to reduce the possibility of interchangeability or replacement by water filters with poor quality.

BACKGROUND

Currently, the demands for water filter apparatuses are becoming more and more popular and focused. Therefore, manufacturers are always aiming for water filter apparatuses which are diversely designed to meet the variety demands of the user at the highest level. The internal components of the water filter apparatus are focused as well for improving not only variety of functions and shapes, but also positioning by different qualities and brands, for example typical water filters or high quality water filters for example.

One among those internal components of the water filter apparatus is a water filter in a configuration of a filter container containing a water filter cartridge therein, such as pre-filtration filter containers for example. For general and popular designs, the water filters and the water filter cartridges are usually provided with a relatively simplified configuration/shape and with a high interchangeability. Therefore, the water filter cartridges without quality assurance are still possible to easily replace for the water filter cartridges with high quality and positioned as premium brands. This not only affects the quality of the product of the customer but also affects the reputation of the manufacturer.

As for an example, a typical water filter 1000 is shown in FIG. 10A, FIG. 10B, and FIG. 10C, substantially including a water filter cartridge body 1011, a first cap 1002, and a second cap 1003. The first cap 1002 and the second cap 1003, are usually the same to each other, with a central hole 1002h for water is capable to flow out therefrom and an annular-shaped area 1002g for arranging a watertight seal. When placing inside the filter container, supposing that the first cap 1002 (similar as for the second cap 1003) is placed to adjoin with the filter container body bottom, the central hole 1002h will be communicated to the filter container outlet (not shown in the drawings), the outer surface of the first cap 1002 faces to the inner surface of the filter container body bottom will be pressed tightly with the inner surface of the filter container body bottom and providing a watertight joint in a face-to-face manner corresponding with the annular-shaped area 1002g. The mentioned design may be known as a relatively popular design in the market, is manufactured by several manufacturers with different qualities. In addition, although the annular-shaped area may be with relatively different sizes, it is still possible to make a watertight joint in a face-to-face manner as for the same type of the filter container. This may lead to a situation in which replacements or miscellaneous uses of poor products for customers can happen.

To overcome this problem, several water filters in the market using distinctive brand identifying sets, however this may not favorably solve the problem of using miscellaneous products with poor quality due to the awareness of the customers. Several customers may be not good at assessing and distinguishing the quality difference between various brands. Moreover, those distinctive brand identifying sets are possible to be faked.

Thus, there is a need for providing a new improvement of a water filter to overcome the mentioned replacements or miscellaneous uses of the water filter with high quality by the water filter with poor quality. In addition, there is also a need for providing a water filter with a favorable robust structure, ensuring for installing, using, and replacing conveniently.

SUMMARY

An object of the present invention is to provide a water filter, may overcome one or more of the above-mentioned problems.

Another object of the present invention is to provide a water filter with an improving structure to overcome the mentioned replacements or miscellaneous uses of the water filter with high quality by the water filter with poor quality.

Yet another object of the present invention is to provide a water filter with a favorable robust structure, ensuring for installing, using, and replacing conveniently.

Various objects to be achieved by the present invention are not limited to the aforementioned objects, and those skilled in the art to which the disclosure pertains may clearly understand other objects from the following descriptions.

To achieve one or more above objects, the present invention provides a water filter comprising:
- a water filter cartridge including a water filter cartridge body, a water filter cartridge outlet cap having a water filter cartridge outlet, and a water filter cartridge sealing cap,
- wherein the water filter cartridge body, is made from one or more filtering materials, in a hollow cylinder form with a central hollow space, one end of the water filter cartridge body is coupled with the water filter cartridge outlet cap so that the central hollow space of the water filter cartridge body communicated with the water filter cartridge outlet, and another end of the water filter cartridge body is coupled with the water filter cartridge sealing cap so that the central hollow space of the water filter cartridge body is sealed at said another end,
- wherein the water filter cartridge outlet with hollow cylinder form protruding from one surface of the water filter cartridge outlet cap;
- a filter container for containing the water filter cartridge therein, wherein the filter container including a filter container body, a filter container cap, a filter container inlet, and a filter container outlet,
- wherein the filter container inlet and the filter container outlet are arranged at a filter container body bottom,
- wherein the filter container body having a filter container outlet cylinder hole provided at the filter container body bottom for receiving the water filter cartridge outlet, so as when water flows into the filter container through the filter container inlet will surround the water filter cartridge and flows through the water filter cartridge body into the central hollow space of the water filter cartridge body, and flows to the filter container outlet through the water filter cartridge outlet, and
- wherein the filter container body having ribs provided at an inner surface of the filter container body bottom to reinforce for the filter container body bottom and providing gaps placed between the inner surface of the filter container body bottom and outer surface of the water filter cartridge outlet cap which is defined as a surface facing toward to the inner surface of the filter container body bottom.

According to an embodiment, the ribs including ribs which are arranged in radical direction from the filter container outlet cylinder hole, and arc ribs which are in circle arc shape surrounding the filter container outlet cylinder hole.

Preferably, said arc ribs arranged at an imaginary circle with the center is at the center of the filter container outlet cylinder hole, in between two adjacent arc ribs there is a separating interval forming water communicating recesses.

According to an embodiment, the water filter cartridge outlet cap having serrated protrusions protruding from the outer surface of the water filter cartridge outlet cap and integrating with the water filter cartridge outlet with hollow cylinder form to reinforce for said water filter cartridge outlet with hollow cylinder form.

The filter container outlet cylinder hole is a hole of a hollow cylinder portion protruding from the inner surface of the filter container body bottom, wherein, the water filter cartridge outlet cap having fitting ribs connecting between the hollow cylinder portion and the arc ribs, the fitting ribs corresponding to the serrated protrusions for stopping the serrated protrusions at a position where they are engaged with each other.

Preferably, the water filter cartridge outlet in a hollow cylinder form having a watertight seal in a ring shape for sealing water when the water filter cartridge outlet is inserted into the filter container outlet cylinder hole.

According to an embodiment, the water filter cartridge outlet in a hollow cylinder form provided with a truncated cone shape to facilitate for inserting into the filter container outlet cylinder hole.

Preferably, the water filter cartridge sealing cap having a protrusion protruding inward to the central hollow space of the water filter cartridge body.

Preferably, the water filter cartridge outlet cap having a hollow cylinder portion protruding inward to the central hollow space of the water filter cartridge body, said hollow cylinder portion having reinforcement ribs arranged in radial direction.

According to an embodiment, the water filter cartridge body is made from PP (polypropylene) material to have a design nominal filter size.

Preferably, wherein the water filter cartridge body is slitted into form recesses in horizontal and vertical direction. In particular, the design nominal filter size is 5 micrometer or 1 micrometer.

According to an embodiment, the water filter cartridge body provided in an extruded carbon block with hollow cylinder form.

According to an embodiment, the water filter cartridge body made from activated carbon particles contained in a cover made from PP material.

Preferably, the water filter cartridge body including a fabric covering layer which is folded as pleated fan for increasing a filter area through the fabric covering layer.

Preferably, the water filter cartridge body further including protecting mesh layer covering outside the fabric covering layer.

BRIEF DESCRIPTION OF THE DRAWINGS

FIG. 10A to FIG. 10C are schematic views illustrating a typical water filter in the prior art.

DESCRIPTION OF EMBODIMENTS

Figure 1A:
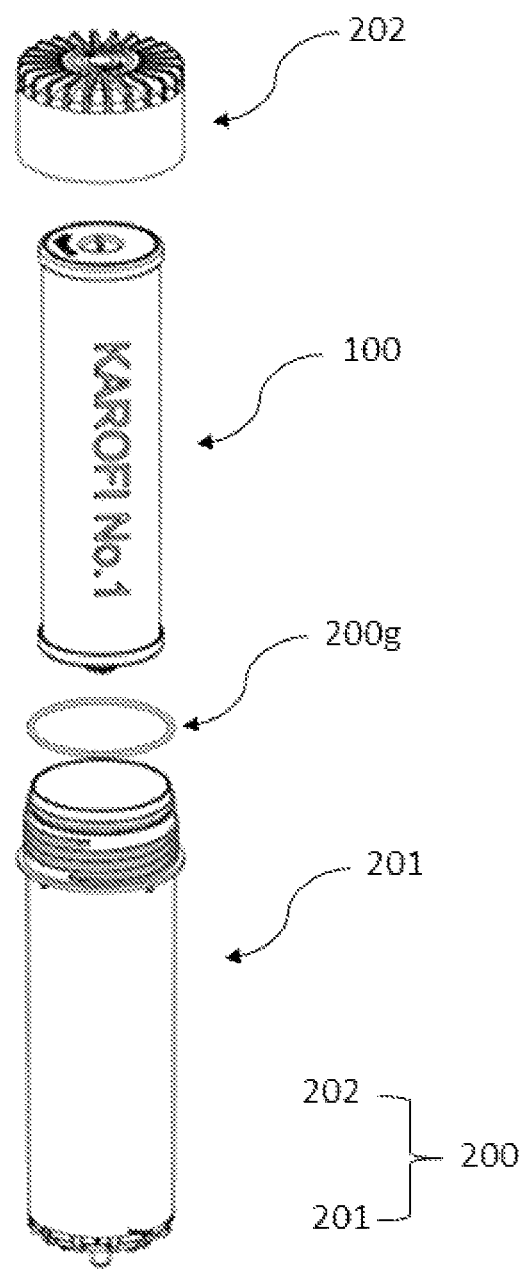
FIG. 1A is an exploded perspective view illustrating a water filter according to an embodiment of the present invention.

Hereinafter, advantages, efficiencies, and inventive concepts of the present invention shall be understood more clearly through the detailed description of the preferred embodiments with reference to the accompanying drawings. In the drawings, same reference numbers are intended to indicate same or equivalent components or elements and commonly used in the whole description, therefore in several drawings or several parts of a drawings may not show one or more reference numbers for a purpose that makes the drawings becoming simplified and facilitating for showing composed components or different inventive concepts of the present invention, in this scenario, relationships between certain components or elements with corresponding reference numbers may be clearly illustrated when referring to other drawings or other components on the drawing. In addition, the components and elements illustrated in the drawings is not complied actual sizes and shapes, several components or elements shall be exaggerated and may be presented by simplified blocks for illustrated purposes and facilitating for descriptive purpose. Therefore, it should be understood that embodiments described herein is only exemplary for fully understanding of the inventive steps and advantages of the present invention, without any limitation of the present invention to the embodiments.

The spatial relatively terms, such as "front", "rear" "length", "width", "height", "above", "on", or the same, may be used herein for descriptive purpose, and, therefore, to describe relationship of a component with other component(s) as illustrated in the drawings. It is obviously that, those terms may be interchangeable by the position or the role for the illustration of actual subject matter according to the present invention, for example, if the illustrated object in the drawings is rotated about 180 degrees for example, components which are described as "front" or "rear" will interchange to each other. Therefore, the spatial relatively terms are used as exemplary for descriptive purpose may be included other meanings indicated for other spatial relationships due to the orientation of the illustrated object, such as the term "front" may encompass "rear", for example.

The terms of order, for example "first", "second", "third", or the same, may be used herein for descriptive purposes while distinguish among elements or components having similar or equivalent functions or characteristics, and it is not understood as defining any constrained order or the number of those elements or components, for example in a certain embodiment may describe that only comprising a second component, and therefore the embodiment no needs the presence of a first component.

Figure 1B:
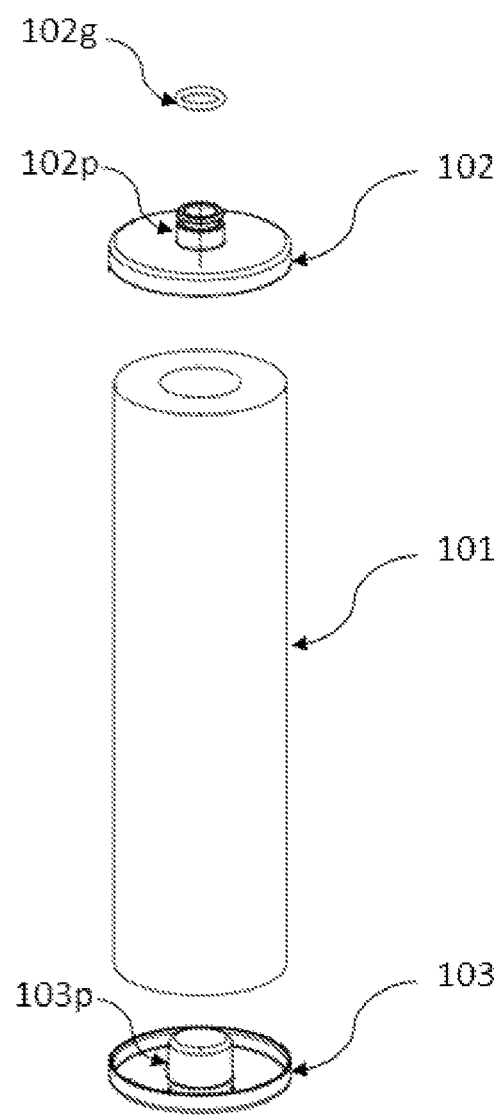
FIG. 1B is an exploded perspective view illustrating a water filter cartridge of the water filter in FIG. 1A.
Figure 1C:
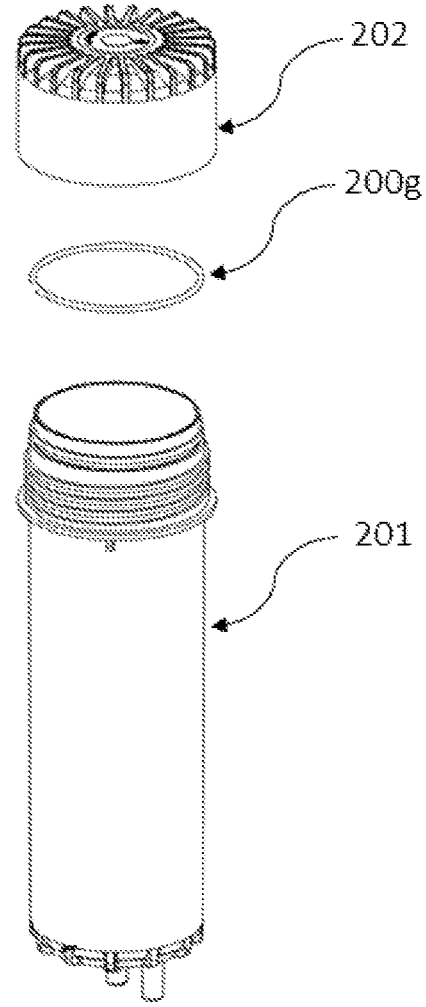
FIG. 1C is an exploded perspective view illustrating a filter container of the water filter in FIG. 1A.

In FIG. 1A to FIG. 1C illustrating a water filter according to an embodiment of the present invention.

According to the embodiment, the water filter substantially including a water filter cartridge 100 is contained inside the filter container 200.

As shown in FIG. 1B, the water filter cartridge 100 including a water filter cartridge body 101, a water filter cartridge outlet cap 102 having a water filter cartridge outlet 102p, and a water filter cartridge sealing cap 103.

In general, the water filter cartridge body 101 may be made from one or more filtering materials, and in a hollow cylinder form with a central hollow space.

According to the embodiment, one end of the water filter cartridge body 101 is coupled with the water filter cartridge outlet cap 102 so that the central hollow space of water filter cartridge body 101 is communicated with the water filter cartridge outlet 102p, and the another end of the water filter cartridge body 101 is coupled with the water filter cartridge sealing cap 103 so that the central hollow space of the water filter cartridge body 101 is sealed at said another end. The water filter cartridge outlet 102p is in a hollow cylinder form protruding from one surface of the water filter cartridge outlet cap 102.

Figure 5A:
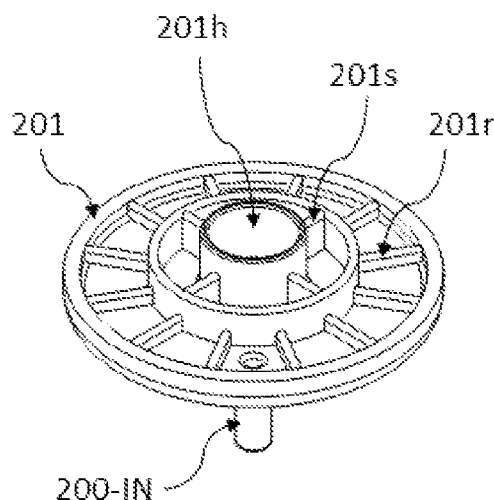
FIG. 5A to FIG. 5D are perspective views in different orientations for illustrating more clearly a filter container body bottom of filter container according to an embodiment of the present invention.
Figure 5B:
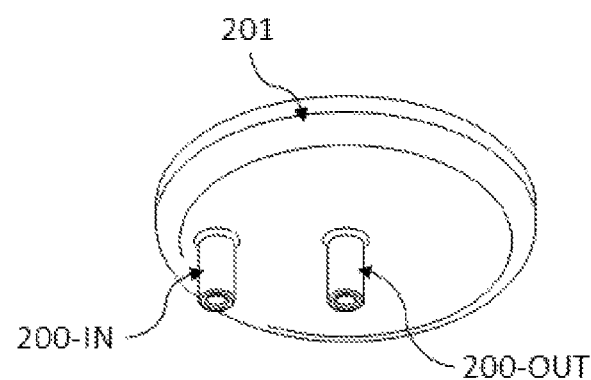
Figure 5C:
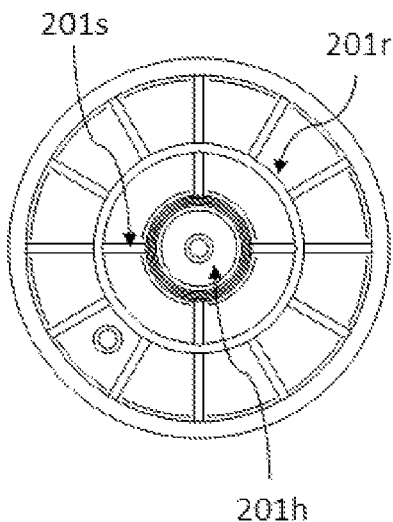
Figure 5D:
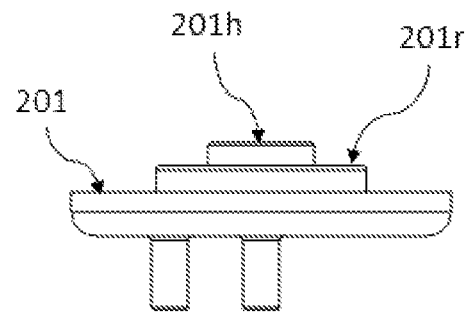
Figure 6A:
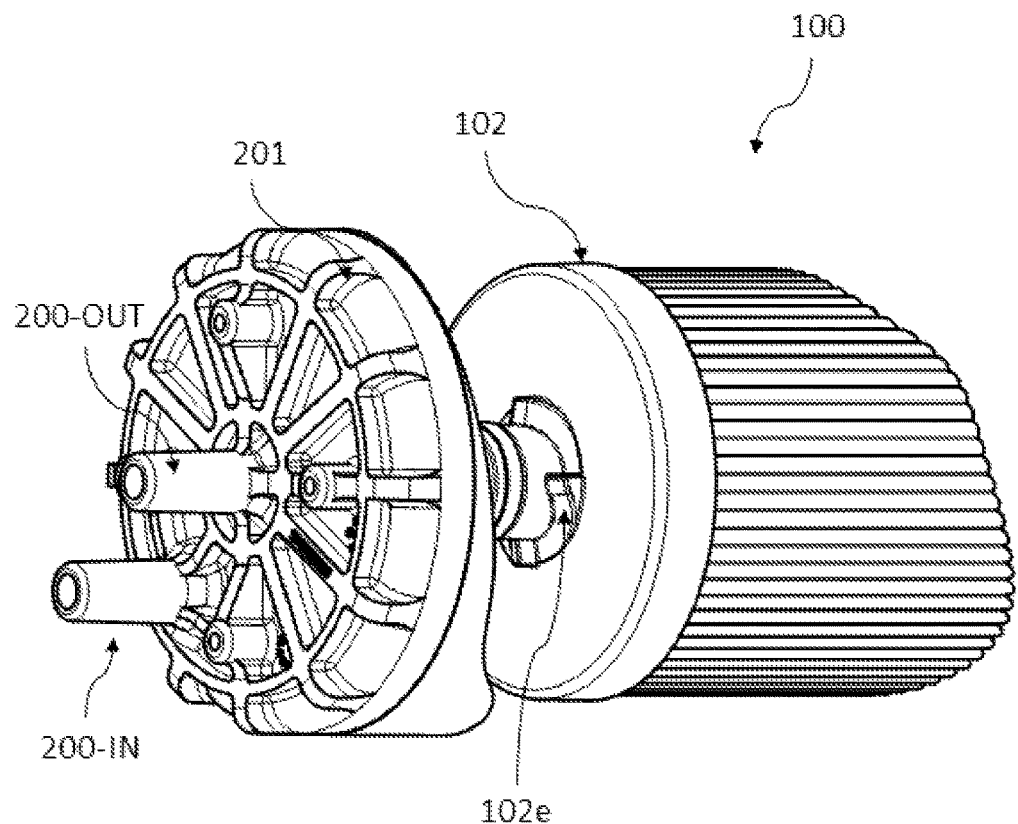
FIG. 6A to FIG. 6C are perspective views illustrating a water filter partially cut off for showing more clearly inside features according to other embodiment of the present invention.

As shown in FIG. 1C, the filter container 200 including a filter container body 201, a filter container cap 202, a filter container inlet 200-IN, and a filter container outlet 200-OUT (see FIG. 5B and FIG. 6A). The filter container inlet 200-IN and the filter container outlet 200-OUT are arranged at the filter container body bottom. The filter container body 201 having a filter container outlet cylinder hole 201h (see FIG. 3A, FIG. 5A, FIG. 5C, and FIG. 6C), is provided at the filter container body bottom for receiving the water filter cartridge outlet 102p, so that when water flows into the filter container 200 through the filter container inlet 200-IN will surround the water filter cartridge 100 and flows through the water filter cartridge body 101 into the central hollow space of the water filter cartridge body 101, and flows to the filter container outlet 200-OUT through the water filter cartridge outlet 102p.

According to one or more embodiment, the filter container body 201 having ribs 201r (see FIG. 3A, FIG. 5A, FIG. 5C, and FIG. 6C) provided at an inner surface of the filter container body bottom to reinforce for the filter container body bottom and providing gaps placed between the inner surface of the filter container body bottom and the outer surface of the water filter cartridge outlet cap 102 which is defined as a surface facing toward to the inner surface of the filter container body bottom.

The embodied design is completely different in comparison to the design of the typical water filter providing replacements or miscellaneous uses of the water filter cartridges with different quality become impossible. In particular, several typical water filters intended to a design which provides a watertight joint in a face-to-face manner corresponding to the outer surface of the water filter cartridge cap, will be impossible to couple and arrange inside the filter container with the design according to the present invention, because that when using the typical water filter, the ribs 201r according the design of the present invention which provides the gaps placed between the inner surface of the filter container body bottom and the outer surface of the water filter cartridge outlet cap, not allow to form a watertight joint in a face-to-face manner, and therefore said miscellaneous use or replacement of the typical water filter for the water filter according to the present invention becomes impossible.

In addition, the water filters generally arrange the filter container outlet at the center of the filter container body bottom and the filter container inlet deviate to a side at the filter container body bottom.

As for the design of the typical water filter, the filter container inlet need to deviate out of the area where the watertight joint in a face-to-face manner is formed. This may be understood that positions which is possible to arrange the filter container inlet is limited. In case of the area of the watertight joint in a face-to-face manner is large may affect to the water circulation between a side with the filter container inlet of the filter container body bottom and the remain side of the filter container body bottom.

As for the design according to the present invention, because the ribs 201r eliminating said area which is needed to form said watertight joint in a face-to-face manner, may significantly avoid the limitation relating to positions which is possible to arrange the above mentioned filter container inlet, also the ribs 201r provide the gaps placed between the inner surface of the filter container body bottom and the outer surface of the water filter cartridge outlet cap, is considered to increase the circulation of water between a side with the filter container inlet of the filter container body bottom and the remain side of the filter container body bottom.

In general, the water filter cartridge body 101 may be made from one or more filtering materials. The water filter cartridge body 101 may be provided in different manners, configurations and shapes, as long as it is capable to perform the filter function as required. Hereinafter, several exemplary embodiments for the water filter cartridges 100 with the water filter cartridge body 101 will be described accompanying with drawings.

Figure 2A:
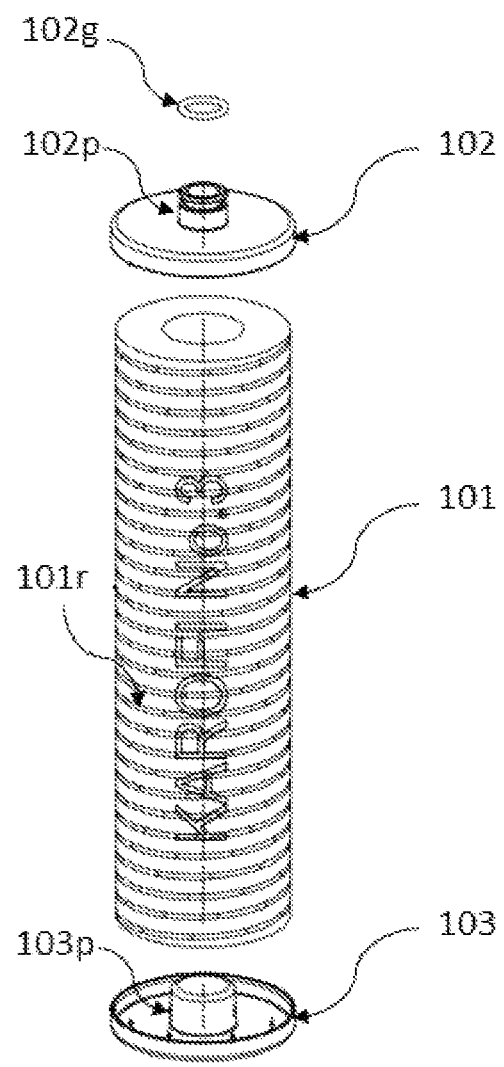
FIG. 2A is an exploded perspective view illustrating a water filter cartridge according to an embodiment of the present invention.

In FIG. 2A illustrating an exemplary embodiment for a water filter cartridge 100. The water filter cartridge 100 including a water filter cartridge body 101, a water filter cartridge outlet cap 102 having a water filter cartridge outlet 102p and a watertight seal 102g in a ring shape, and a water filter cartridge sealing cap 103 having a protrusion 103p protruding inward to a central hollow space of the water filter cartridge body 101.

The water filter cartridge body 101 according to the exemplary embodiment is made from polypropylene to have a design nominal filter size, and slitted into form recesses 101r in horizontal direction (or vertical direction) for improving the filter efficiency. The design nominal filter size may be corresponding to popular sizes, for example 5 micrometer or 1 micrometer, or may be any size as required.

Figure 2B:
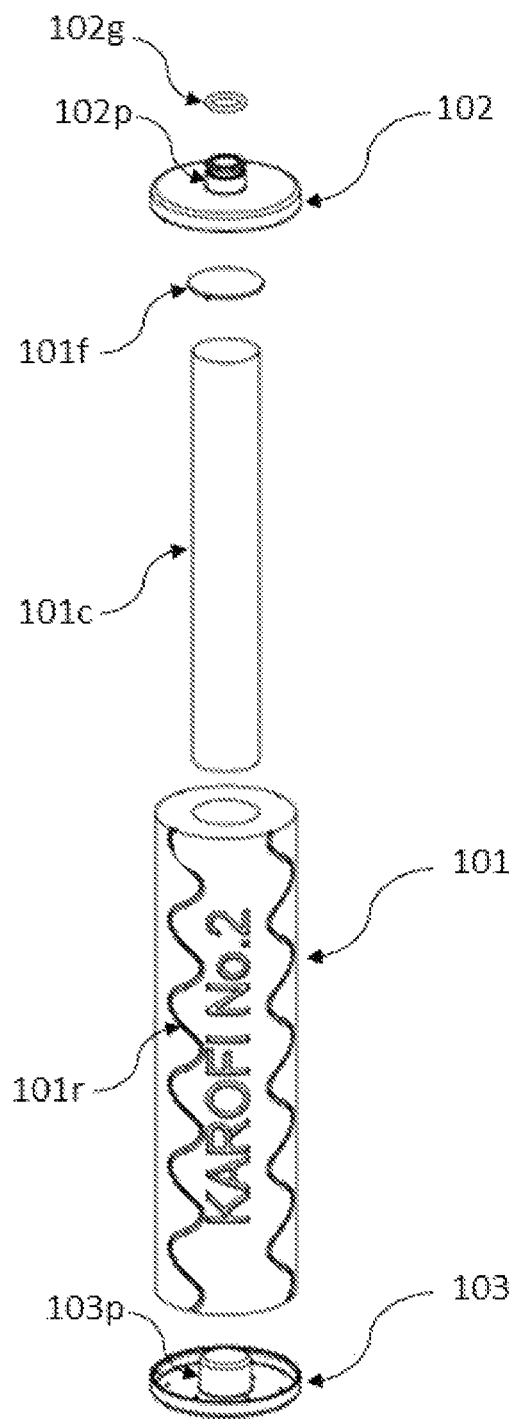
FIG. 2B is an exploded perspective view illustrating a water filter cartridge according to other embodiment of the present invention.

In FIG. 2B illustrating an exemplary embodiment for a water filter cartridge 100. The water filter cartridge 100 including a water filter cartridge body 101, a water filter cartridge outlet cap 102 having a water filter cartridge outlet 102p and a watertight seal 102g in a ring shape, and a water filter cartridge sealing cap 103 having a protrusion 103p protruding inward to a central hollow space of the water filter cartridge body 101.

The water filter cartridge body 101 according to the exemplary embodiment having a filtering material block 101c using activated carbon particles (may be contained in a cover made from PP material) is inserted inside the water filter cartridge body 101 in a hollow cylinder form. A filter cloth 101f, may be made from PP material or the same, arranged at a side of the water filter cartridge outlet for preventing the activated carbon particles come to the water filter cartridge outlet. The water filter cartridge body 101 also having recesses 101r slitted in vertical direction (or horizontal direction) similar to above description.

Figure 2C:
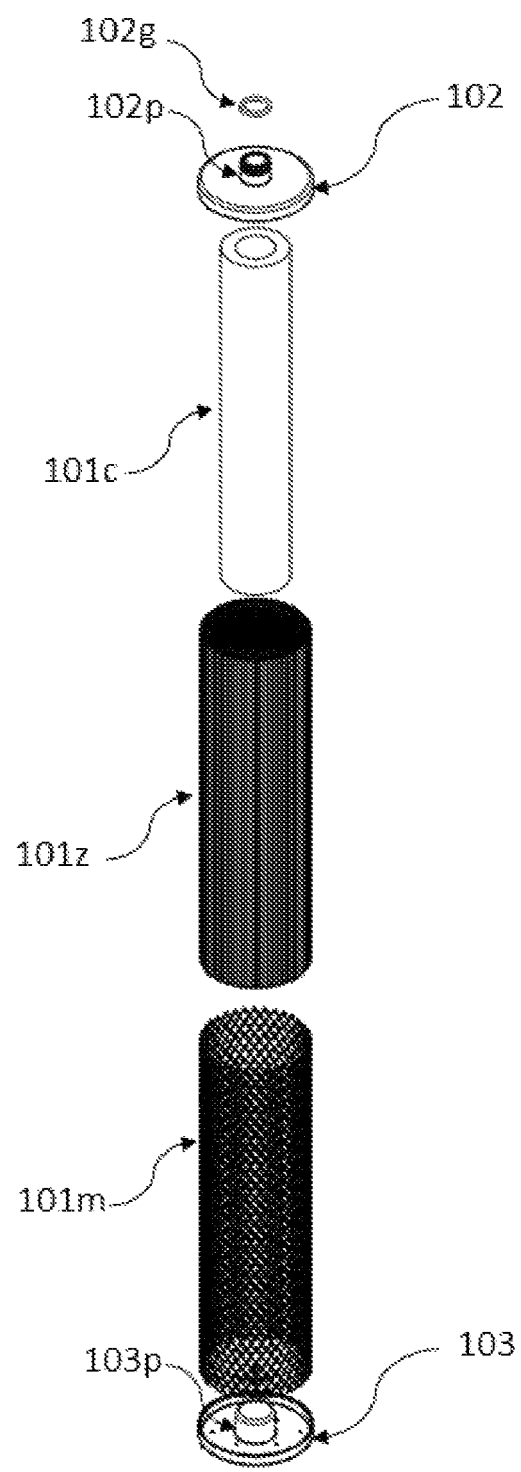
FIG. 2C is an exploded perspective view illustrating a water filter cartridge according to yet another embodiment of the present invention.

In FIG. 2C illustrating an exemplary embodiment for a water filter cartridge 100. The water filter cartridge 100 including a water filter cartridge body 101, a water filter cartridge outlet cap 102 having a water filter cartridge outlet 102p and a watertight seal 102g in a ring shape, and a water filter cartridge sealing cap 103 having a protrusion 103p protruding inward to a central hollow space of the water filter cartridge body 101.

The water filter cartridge body 101 according to the exemplary embodiment having a filtering material block 101c, a fabric covering layer 101z which is folded as pleated fan, and a protecting mesh layer 101m. The filtering material block 101c may be made from one or more filtering materials in different configurations or shapes, surrounded by the fabric covering layer 101z which is folded as pleated fan. The fabric covering layer 101z which is folded as pleated fan is surrounded by the protecting mesh layer 101m.

Figure 2D:
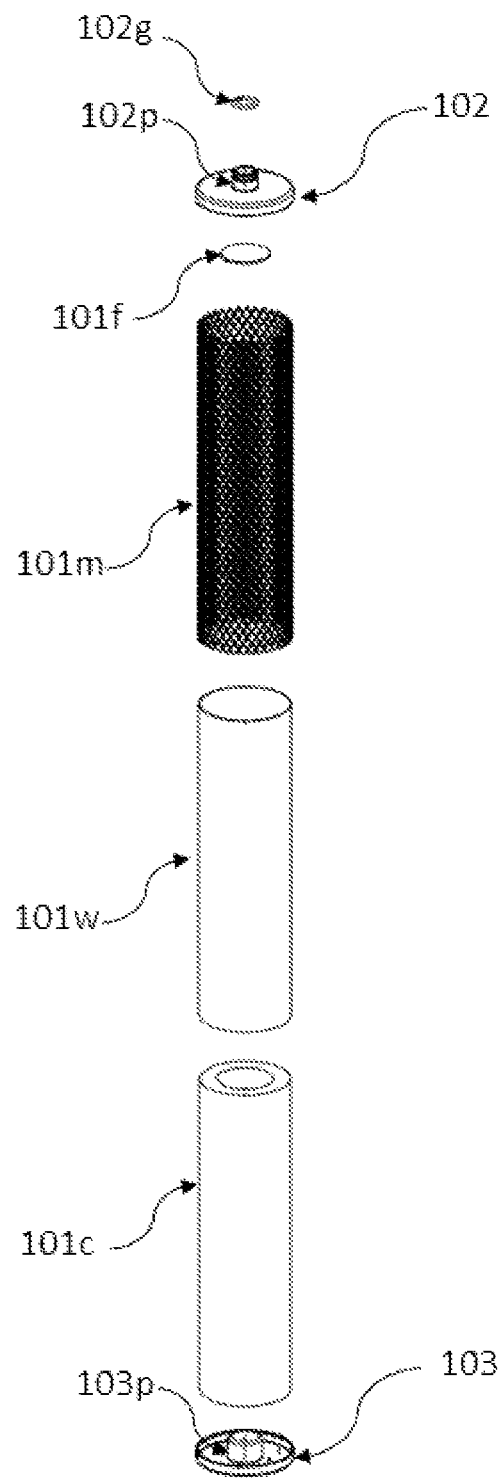
FIG. 2D is an exploded perspective view illustrating a water filter cartridge according to yet another embodiment of the present invention.

In FIG. 2D illustrating an exemplary embodiment for a water filter cartridge 100. The water filter cartridge 100 including a water filter cartridge body 101, a water filter cartridge outlet cap 102 having a water filter cartridge outlet 102p and a watertight seal 102g in a ring shape, and a water filter cartridge sealing cap 103 having a protrusion 103p protruding inward to the central hollow space of the water filter cartridge body 101.

The water filter cartridge body 101 according to the exemplary embodiment having a filtering material block 101c, a fabric covering layer 101w, a protecting mesh layer 101m, and a filter cloth 101f. The filtering material block 101c may be made from one or more different filtering materials in different configurations and shapes, surrounded by the fabric covering layer 101w. The fabric covering layer 101w surrounded by the protecting mesh layer 101m. The filter cloth 101f, may be made from PP material or the same, arranged in a side of the water filter cartridge outlet for preventing filtering material coming to the water filter cartridge outlet.

Figure 3A:
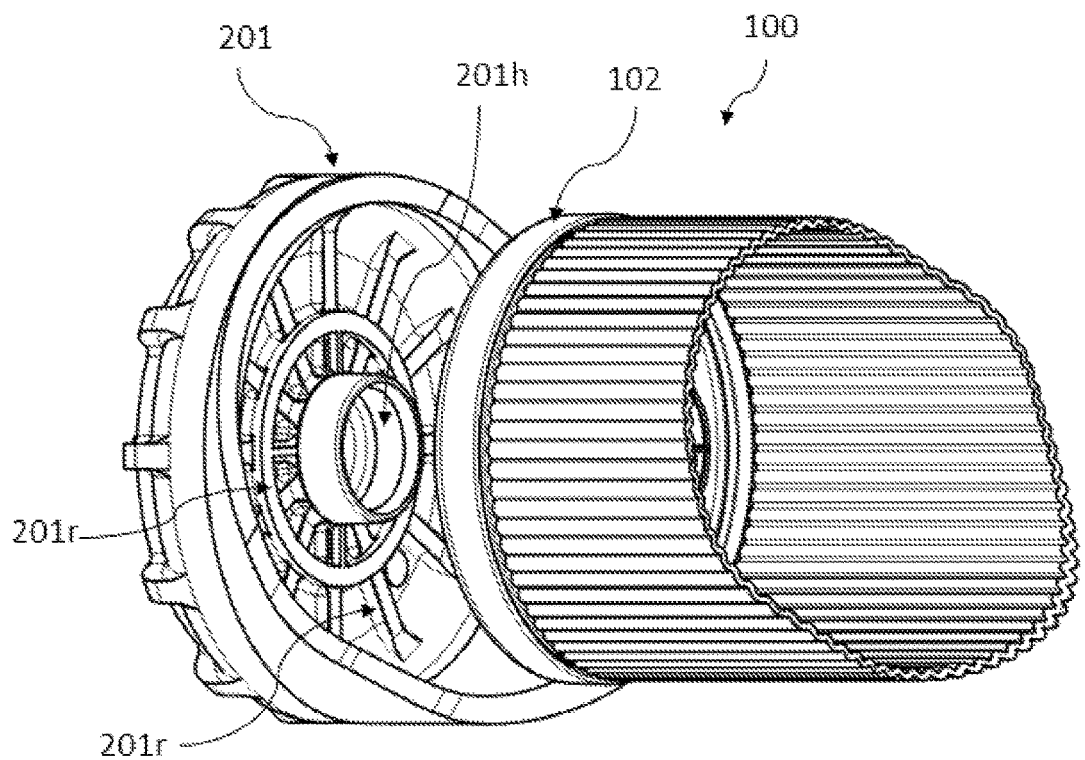
FIG. 3A and FIG. 3B are perspective views illustrating a water filter are partially cut for showing more clearly the inside features according to an embodiment of the present invention.
Figure 3B:
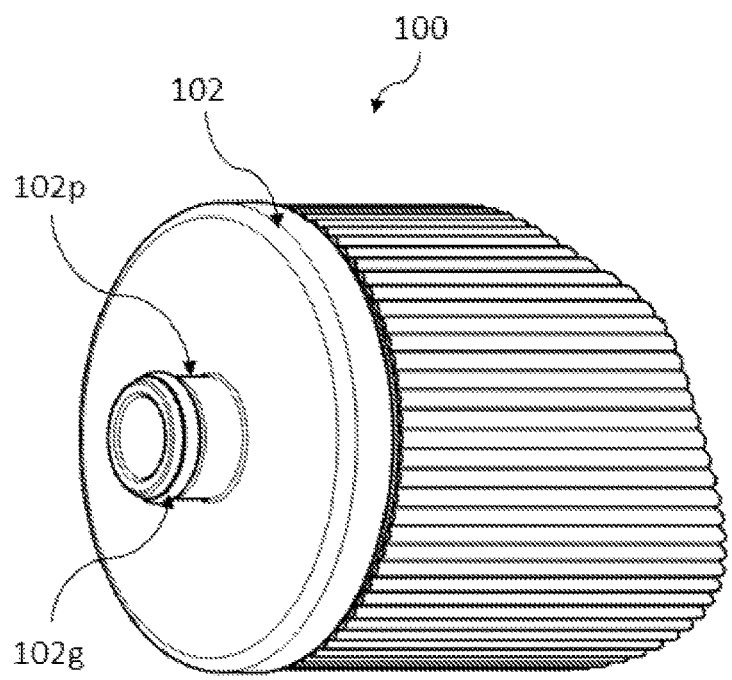
Figure 4A:
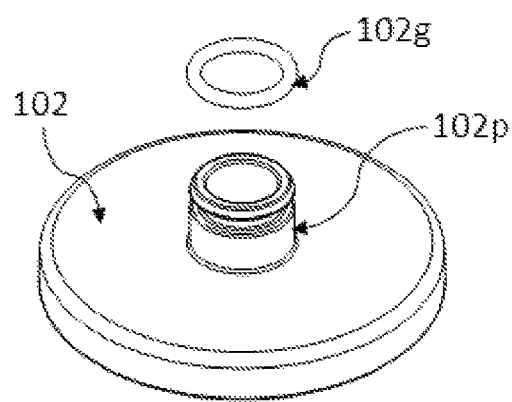
FIG. 4A to FIG. 4D are perspective views in different orientations for illustrating more clearly a water filter cartridge outlet cap according to an embodiment of the present invention.
Figure 4B:
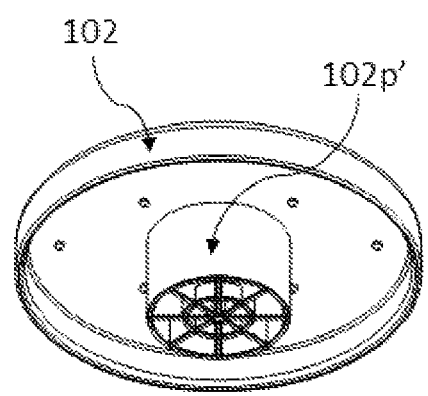
Figure 4C:
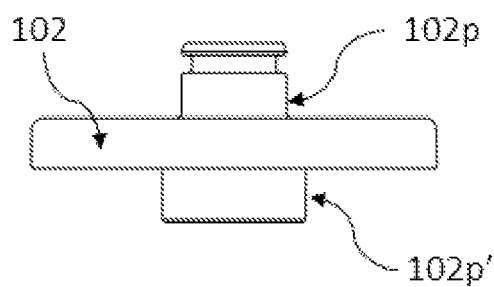
Figure 4D:
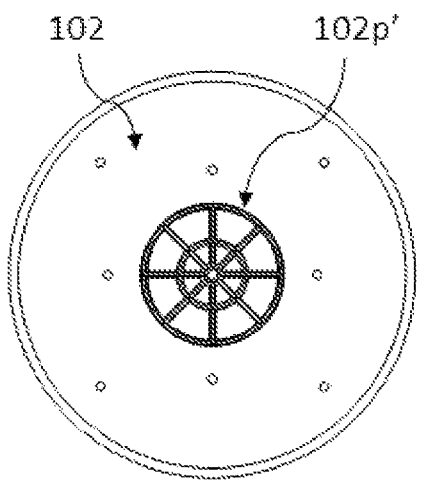

In FIG. 3A and FIG. 3B illustrating more clearly the relationship of the water filter cartridge outlet cap and the filter container body bottom. FIG. 3A is a perspective view, wherein the filter container body 201 is partially cut off for exposing the inner surface of the filter container body bottom, and FIG. 3B is a perspective view illustrating more clearly the water filter cartridge outlet cap 102 coupled at one end of the water filter cartridge body 101.

As shown in the drawings, the water filter cartridge outlet cap 102 is coupled or attached at one end of the water filter cartridge body 101 in a watertight manner so that the water only circulates through the water filter cartridge outlet 102p. Said coupling or attaching may be made by using adhesive, solder, or the same. After that the water filter cartridge body 101 coupling with the water filter cartridge outlet cap 102 (and the water filter cartridge sealing cap 103), is installed inside the filter container 200 so that the water filter cartridge outlet 102p is inserted into the filter container outlet cylinder hole 201h and guaranteed for a watertight manner by the watertight seal 102g.

The ribs 201r is provided at the inner surface of the filter container body bottom.

According to the illustrated embodiment, the ribs 201r including the ribs 201r which are arranged in radical direction from the filter container outlet cylinder hole, and arc ribs 201r which are in circle arc shape surrounding the filter container outlet cylinder hole. The ribs 201r not only take a role for reinforcing the filter container body bottom, but also stopping the outer surface of the water filter cartridge outlet cap 102 at a suitable position with gaps placed between the inner surface of the filter container body bottom and the outer surface of the water filter cartridge outlet cap, preventing the possibility to provide a watertight in a face-to-face manner mentioned above, and therefore solve the problem of replacements or miscellaneous uses of the water filter cartridges with different qualities.

In FIG. 4A to FIG. 4D illustrating more clearly the water filter cartridge outlet cap 102. The water filter cartridge outlet cap 102 is illustrated as having a water filter cartridge outlet 102p, a watertight seal 102g, and a hollow cylinder portion 102p'. The hollow cylinder portion 102p' protruding inward to the central hollow space of the water filter cartridge body 101, the hollow cylinder portion 102p' having reinforcement ribs arranged in the radial direction.

In FIG. 5A to FIG. 5D illustrating more clearly the filter container body bottom of the filter container 200.

As shown in the drawings, at the filter container body bottom of the filter container 200 there is a filter container inlet 200-IN and a filter container outlet 200-OUT protruding outward, ribs 201r protruding inward, the filter container outlet cylinder hole 201h is the hole of the hollow cylinder portion protruding from the inner surface of the filter container body bottom.

As illustrated, the hollow cylinder portion corresponding to the filter container outlet cylinder hole 201h protrudes higher than the ribs 201r, and having fitting ribs 201s with at least a function to reinforce for the hollow cylinder portion.

Figure 6B:
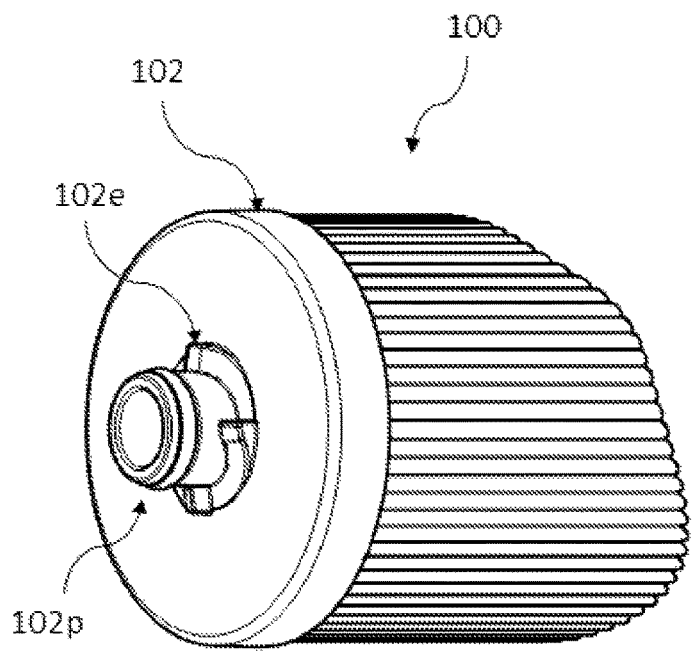
Figure 6C:
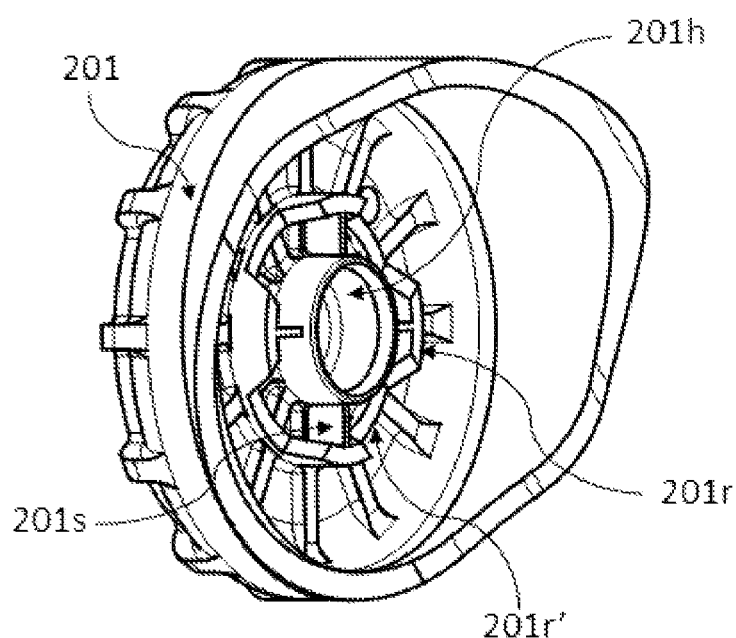
Figure 7A:
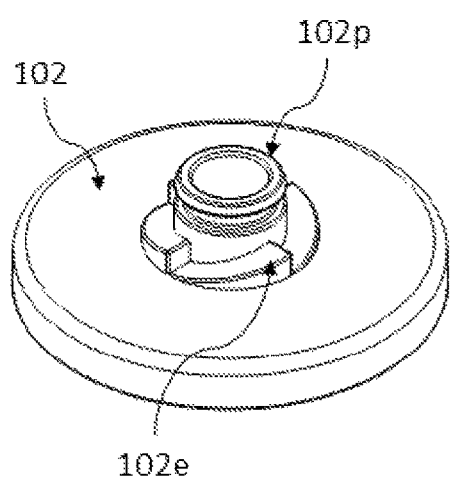
FIG. 7A to FIG. 7D are perspective views in different orientations for illustrating more clearly a water filter cartridge outlet cap according to other embodiment of the present invention.
Figure 7B:
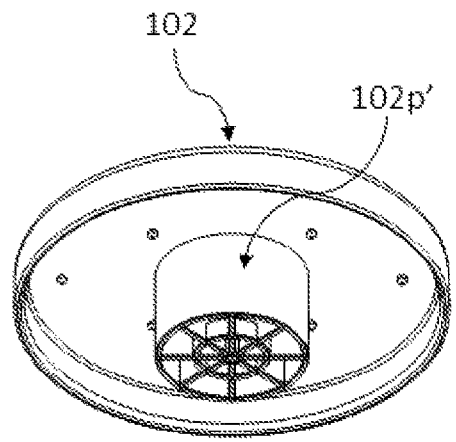
Figure 7C:
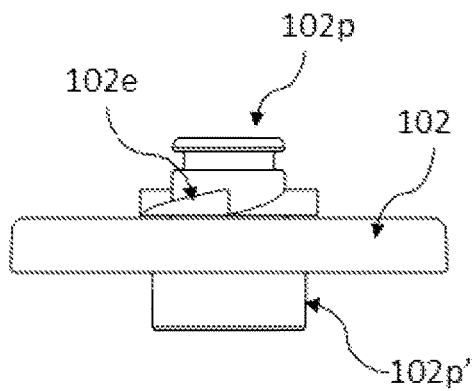
Figure 7D:
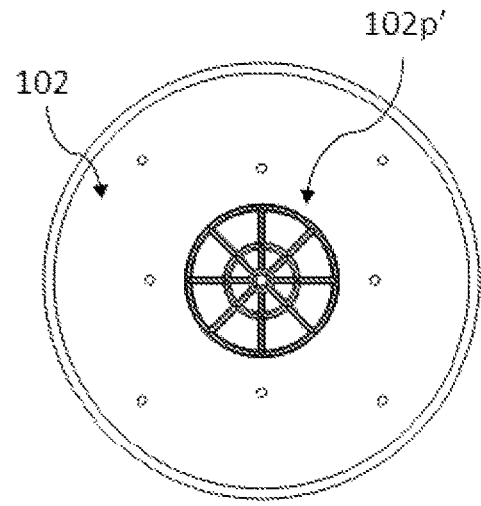
Figure 8A:
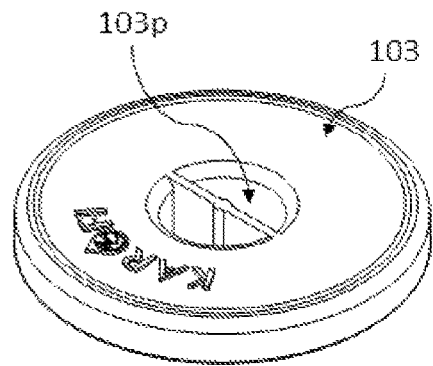
FIG. 8A to FIG. 8D are perspective views in different orientations for illustrating more clearly a water filter cartridge sealing cap according to an embodiment of the present invention.
Figure 8B:
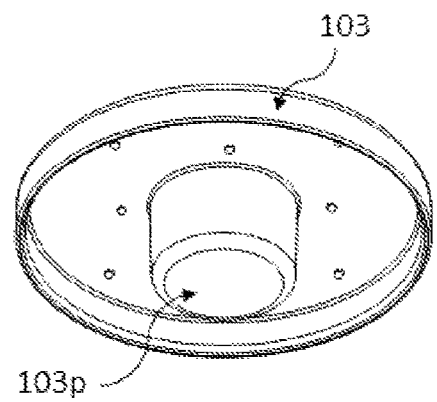
Figure 8C:
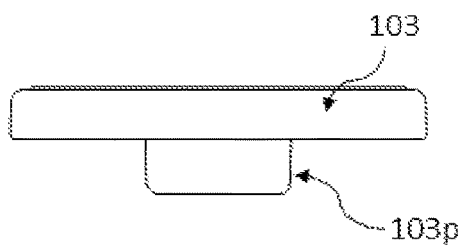
Figure 8D:
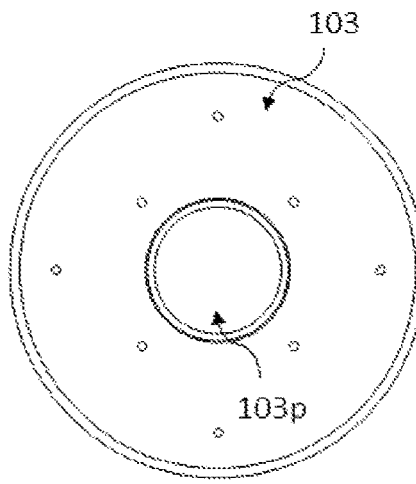

In FIG. 6A to FIG. 6C, and for FIG. 7A to FIG. 7D illustrating the water filter according to other embodiment of the present invention.

According to the embodiment, several components of the water filter are substantially the same as above descriptions, thus their repeated descriptions will be omitted to avoid redundancy. Hereinafter, only different features are described.

According to the embodiment, the water filter cartridge outlet cap 102 having serrated protrusions 102e protruding from the outer surface of the water filter cartridge outlet cap 102 and integrating with the water filter cartridge outlet 102p in a hollow cylinder form to reinforce for the water filter cartridge outlet 102p in a hollow cylinder form.

The fitting ribs 201s are arranged corresponding to the serrated protrusions 102e to stop the serrated protrusions 102e at a position where they are engaged with each other. As such, the serrated protrusions 102e are easily rotated and engaged, making the installation or replacement of the water filter cartridge is convenient. As the results, the fitting ribs 201s, the serrated protrusions 102e not only have the reinforcing function but also have the function for preventing any miscellaneous use.

According to an alternative embodiment, the fitting ribs 201s may also be made in serrated form which is engageable with the serrated protrusions 102e.

As shown in FIG. 6C, the filter container body bottom having the arc ribs 201r arranged at an imaginary circle with the circle center is the center of the filter container outlet cylinder hole, in between two adjacent arc ribs 201r there is a separating interval forming water communicating recesses 201r'.

In FIG. 7A to FIG. 7D illustrating more clearly the water filter cartridge outlet cap 102. The water filter cartridge outlet cap 102 is illustrated as having a water filter cartridge outlet 102p, a serrated protrusions 102e, and a hollow cylinder portion 102p'. Similar to above descriptions, the hollow cylinder portion 102p' protruding inward to the central hollow space of the water filter cartridge body 101, the hollow cylinder portion 102p' having reinforcement ribs arranged in the radial direction.

In FIG. 8A to FIG. 8D illustrating more clearly the water filter cartridge sealing cap 103. The water filter cartridge sealing cap 103 having a protrusion 103p protruding inward to the central hollow space of the water filter cartridge body.

Obviously, the water filter according to the present invention may be applied in any water filter apparatus.

Figure 9:
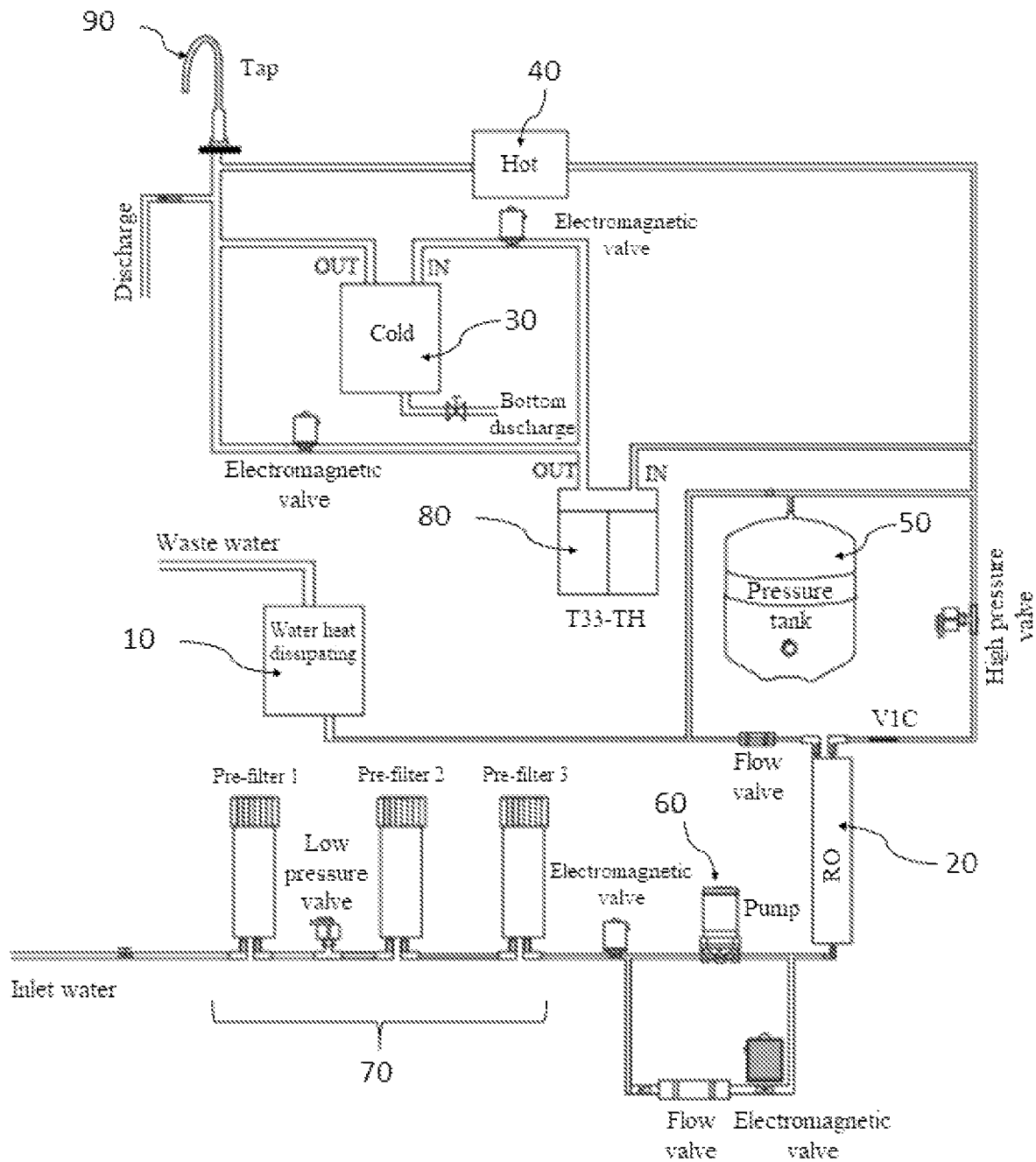
FIG. 9 is a schematic principle diagram of a water filter apparatus according to an embodiment of the present invention.
Figure 10A:
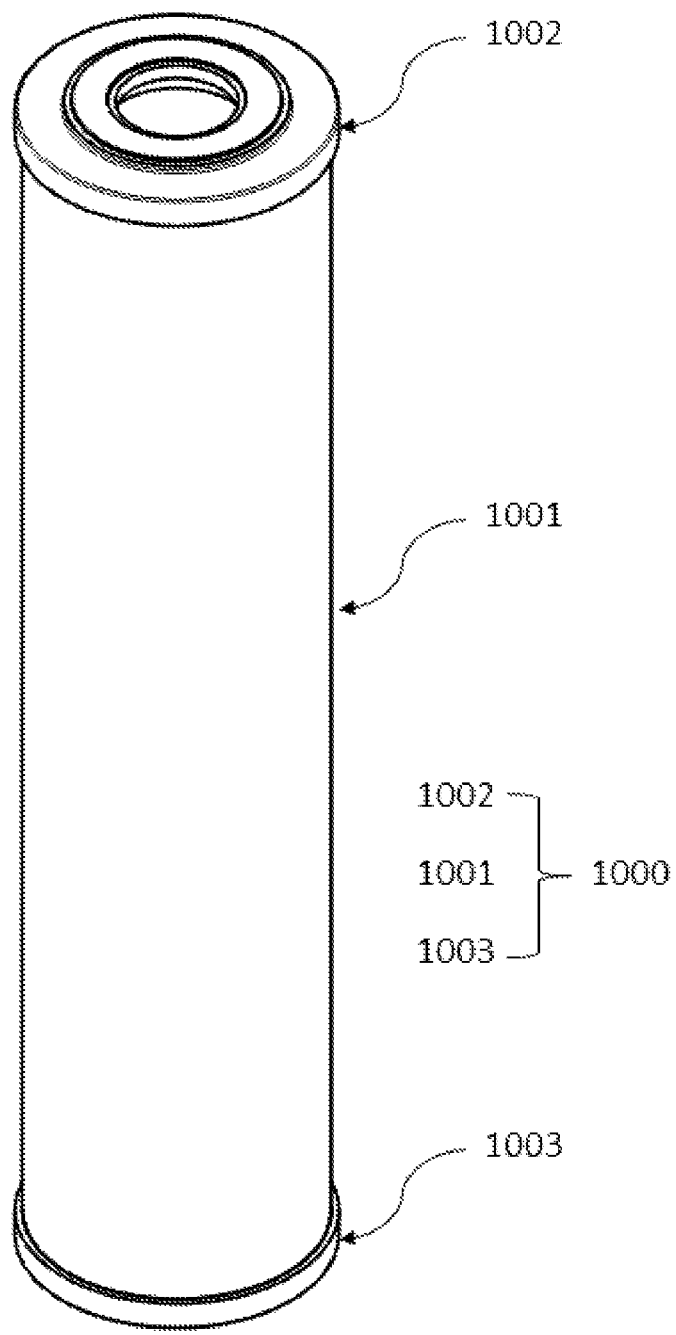

FIG. 9 is a schematic principle diagram illustrating the water filter apparatus according to an embodiment of the present invention. In general, the water filter apparatus according to the embodiment using the water filter according to the present invention in a pre-filter cartridge assembly.

As shown in FIG. 9, the water filter apparatus according to the exemplary embodiment comprising: a water heat dissipating container 10, a RO filter cartridge 20, a water cooling container 30, a water heating tank 40, a pressure tank 50, a booster pump 60, a pre-filter cartridge assembly 70, a functional filter cartridge assembly 80 (T33-TH), and user water tap 90.

In general, the water filter apparatus according to the embodiment having main components are substantially similar to those of prior water filter apparatuses, except that it using the water filter as described above in the pre-filter cartridge assembly 70. The main components such as the RO filter cartridge 20, the water cooling container 30, the water heating tank 40, the pressure tank 50, the booster pump 60, the pre-filter cartridge assembly 70, the functional filter cartridge assembly 80 (T33-TH), and the user water tap 90, may be provided to have functions and operations similar to those of the prior water filter apparatuses and may be arranged by any way, wherein among these components may arranging electromagnetic valves, a low pressure valve, a high pressure valve, a flow valve (the flow valve, such as Flow 30 for example), an one-way valve (V1C), etc., appropriately to be capable of automatically carry out the water filtering function of the water filter apparatus.

In general, the water heat dissipating container 10 is provided adaptively for containing a portion of the condenser coil and cooling down said condenser coil of the water filter apparatus. The water heat dissipating container 10 is supplied with water from the waste water outlet of the RO filter cartridge and an additional pipeline connected from the pressure tank 50. In addition, the water regulating valve are arranged on the water return line connected at the outlet of the booster pump 60, is an electromagnetic valve combined with a flow valve. Thus, the water heat dissipating system of the water filter apparatus may operate simultaneously with the RO water filtering, but the water heat dissipating system may also operate independently without an operation requirement of the RO water filtering within several/some certain times, for example when water is stored relatively full in the pressure tank 50 and having a relatively high pressure, for example.

Although some embodiments have been described herein, and may accompanying with alternative or equivalent embodiments or specific exemplarily embodiment, using suitable descriptive terms and technical terms for person skilled in the art may understand and pertain the present invention. Therefore, the person skilled in the art may obviously implement modifications, equivalent arrangements, or variations based on the described embodiments. Therefore, all these modifications, equivalents, or variations fall within the protection scope of the claims appended, and the scope of the protection of the present invention is obviously not limited to contents and descripted embodiments but is defined in the following claims.

What is claimed is:

1. A water filter comprising:
a water filter cartridge including a water filter cartridge body, a water filter cartridge outlet cap having a water filter cartridge outlet, and a water filter cartridge sealing cap,
wherein the water filter cartridge body, is made from one or more filtering materials, in a hollow cylinder form with a central hollow space, one end of the water filter cartridge body is coupled with the water filter cartridge outlet cap so that the central hollow space of the water filter cartridge body communicated with the water filter cartridge outlet, and another end of the water filter cartridge body is coupled with the water filter cartridge sealing cap so that the central hollow space of the water filter cartridge body is sealed at said another end,
wherein the water filter cartridge outlet with hollow cylinder form is protruding from one surface of the water filter cartridge outlet cap;
a filter container for containing the water filter cartridge therein, wherein the filter container including a filter container body, a filter container cap, a filter container inlet, and a filter container outlet,
wherein the filter container inlet and the filter container outlet are arranged at a filter container body bottom,
wherein the filter container body having a filter container outlet cylinder hole provided at the filter container body bottom for receiving the water filter cartridge outlet, so as when water flows into the filter container through the filter container inlet will surround the water filter cartridge and flows through the water filter cartridge body into the central hollow space of the water filter cartridge body, and flows to the filter container outlet through the water filter cartridge outlet, and
wherein the filter container body having ribs provided at an inner surface of the filter container body bottom to reinforce for the filter container body bottom and providing gaps placed between the inner surface of the filter container body bottom and outer surface of the water filter cartridge outlet cap which is defined as a surface facing toward to the inner surface of the filter container body bottom;

wherein:

the ribs including ribs which are arranged in radial direction from the filter container outlet cylinder hole, and arc ribs which are in a circle arc shape surrounding the filter container outlet cylinder hole, wherein said arc ribs are arranged at an imaginary circle with a center of the filter container outlet cylinder hole, and in between two adjacent arc ribs there is a separating interval forming water communicating recesses;

the water filter cartridge outlet cap having serrated protrusions protruding from the outer surface of the water filter cartridge outlet cap and integrating with the water filter cartridge outlet with hollow cylinder form to reinforce for said water filter cartridge outlet with hollow cylinder form; and the filter container outlet cylinder hole is a hole of a hollow cylinder portion protruding from the inner surface of the filter container body bottom, wherein, the hollow cylinder portion corresponding to the filter container outlet cylinder hole having fitting ribs connecting between the hollow cylinder portion and the arc ribs, the fitting ribs corresponding to the serrated protrusions for stopping the serrated protrusions at a position where they are engaged with each other.

2. The water filter according to claim 1, wherein the water filter cartridge outlet in a hollow cylinder form having a watertight seal in a ring shape for sealing water when the water filter cartridge outlet is inserted into the filter container outlet cylinder hole.

3. The water filter according to claim 1, wherein the water filter cartridge outlet in a hollow cylinder form is provided with a truncated cone shape to facilitate for inserting into the filter container outlet cylinder hole.

4. The water filter according to claim 1, wherein the water filter cartridge sealing cap having a protrusion protruding inward to the central hollow space of the water filter cartridge body.

5. The water filter according to claim 1, wherein the water filter cartridge outlet cap having a hollow cylinder portion protruding inward to the central hollow space of the water filter cartridge body, said hollow cylinder portion having reinforcement ribs arranged in a radial direction.

6. The water filter according to claim 1, wherein the water filter cartridge body is made from polypropylene material to have a design nominal filter size.

7. The water filter according to claim 6, wherein the water filter cartridge body is slitted into form recesses in horizontal and vertical direction.

8. The water filter according to claim 7, wherein the design nominal filter size is 5 micrometer or 1 micrometer.

9. The water filter according to claim 1, wherein the water filter cartridge body is provided in an extruded carbon block with hollow cylinder form.

10. The water filter according to claim 1, wherein the water filter cartridge body is made from activated carbon particles contained in a cover made from polypropylene material.

11. The water filter according to claim 1, wherein the water filter cartridge body including a fabric covering layer which is folded as a pleated fan for increasing a filter area through the fabric covering layer.

12. The water filter according to claim 11, wherein the water filter cartridge body further including a protecting mesh layer covering outside the fabric covering layer.

* * * * *